March 5, 1957 E. R. DYE ET AL 2,784,006
CHEST CRASH PROTECTOR FOR VEHICLE STEERING WHEELS
Filed Sept. 10, 1954 2 Sheets-Sheet 1
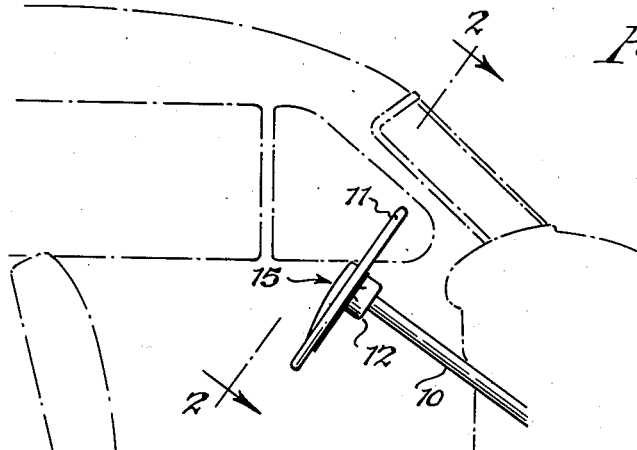
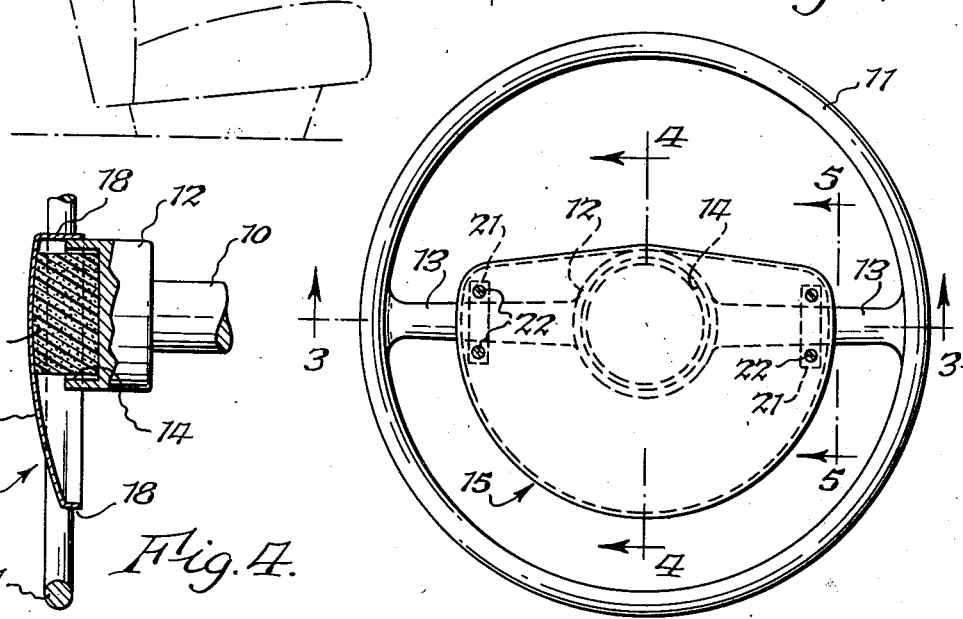
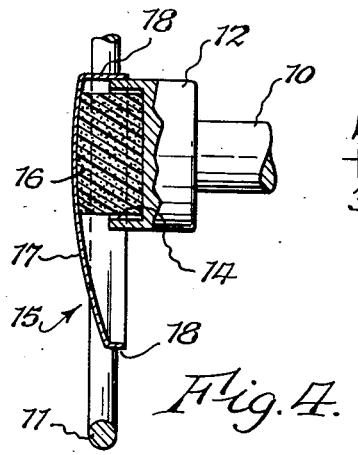
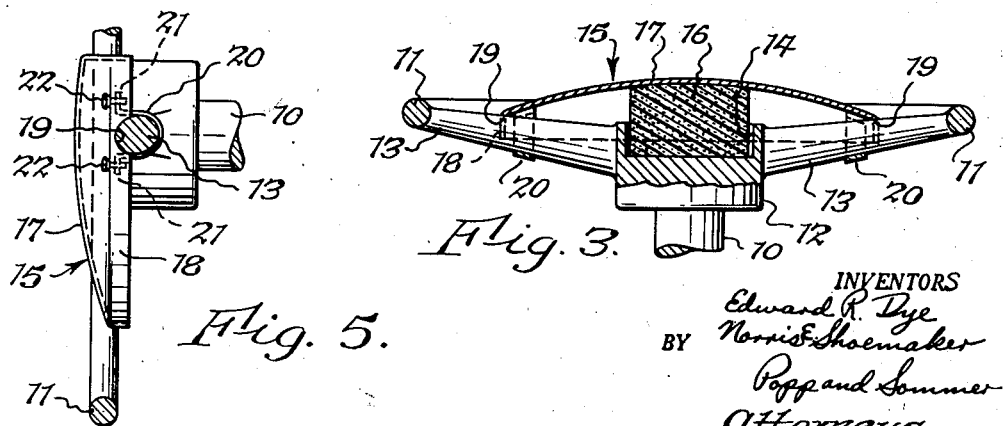
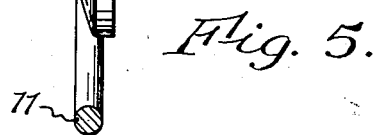
INVENTORS
Edward R. Dye
Norris E. Shoemaker
BY
Popp and Sommer
Attorneys.

March 5, 1957     E. R. DYE ET AL     2,784,006
CHEST CRASH PROTECTOR FOR VEHICLE STEERING WHEELS
Filed Sept. 10, 1954     2 Sheets-Sheet 2

INVENTOR.
Edward R. Dye
Norris E. Shoemaker
BY
Popp and Sommer
Attorneys.

United States Patent Office 2,784,006
Patented Mar. 5, 1957

2,784,006

CHEST CRASH PROTECTOR FOR VEHICLE STEERING WHEELS

Edward R. Dye, Orchard Park, and Norris E. Shoemaker, Williamsville, N. Y., assignors to Cornell Aeronautical Laboratory, Inc., Buffalo, N. Y., a corporation of New York Application September 10, 1954, Serial No. 455,243

4 Claims. (Cl. 280—150)

This invention relates to safety devices for automotive vehicles and, more particularly, to a protector arranged at the driver's end of the steering post of the vehicle to protect the body of the driver against injury incident to a sudden deceleration of the vehicle which causes the driver's body to be thrown forwardly against the steering post.

Accident surveys have disclosed that one of the main sources of serious injury to the drivers of automobiles involved in accidents is the steering wheel post. The steering wheel, while often helping to protect the driver under low deceleration conditions by effectively restraining movements of his body, becomes an extremely lethal item for high decelerations. The rim of the steering wheel, supported by one or more spokes generally deflects downwardly along the steering post when impacted by the human body with any appreciable force, thus leaving the end of the post protruding. Such post end so exposed then becomes an effective spear upon which the driver can impale himself or otherwise cause severe bodily injury. Broken ribs, punctured lungs and throat wounds occur quite often from this cause.

Generally speaking, the present invention is directed toward providing a solution to this problem of protecting the driver of the vehicle from injury resulting from impact of his body with the steering post.

An object of the present invention is to provide a protector which operates to distribute the initial impact force over a large area of the body, specifically the chest region, thus reducing a concentrated load.

A further object is to provide such a protector which deflects as a unitary structure under the distributed load previously mentioned, thus further reducing the possibility of localized concentrated load.

A further object is to provide such a protector which is adapted to have an overall deflection as large as possible, but with a force relationship intended to absorb a high percentage of the impact energy and, at the same time, keep the body impact deceleration low.

A further aim is to provide such a protector which is adaptable to most models of steering wheels and in no way interferes with the manipulation of the steering wheel for purposes of steering the vehicle and also does not interfere with sight through the margin of the steering wheel of the usual gauges on the instrument panel of the vehicle.

Another aim is to provide such a protector which has a tough, durable and lightweight construction which is relatively inexpensive to manufacture.

A further object is to provide such a protector which can be readily mounted on the steering wheel and post.

Other objects and advantages of the invention will be apparent from the following description and accompanying drawings in which:

Fig. 1 is an elevational side view of a steering wheel and post equipped with a chest protector embodying the present invention and shown arranged in the passenger compartment of an automotive vehicle indicated by broken lines.

Fig. 2 is a front elevational view of the steering wheel and chest protector shown in Fig. 1, this view being taken on line 2—2, Fig. 1.

Fig. 3 is a horizontal sectional view through the steering wheel and chest protector, this view being taken on line 3—3, Fig. 2.

Fig. 4 is a vertical sectional view through the chest protector shown in Fig. 2, this view being taken on line 4—4, Fig. 2.

Fig. 5 is another vertical sectional view through one of the spokes of the steering wheel and showing one side of the chest protector in elevation, this view being taken on line 5—5, Fig. 2.

Figure 6:
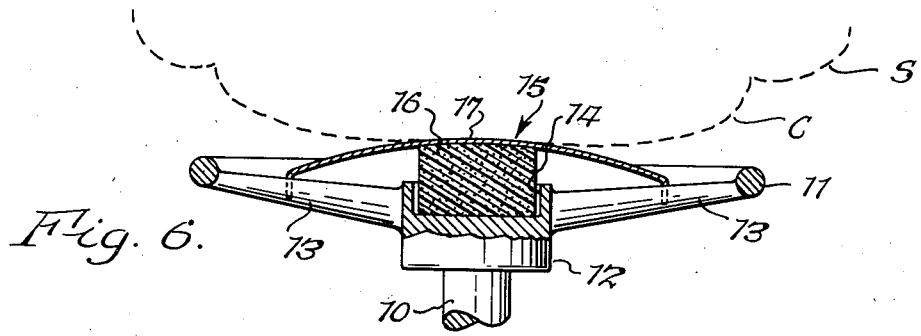
Fig. 6 is a horizontal view generally similar to Fig. 3 but showing the chest of the driver as it first engages the protector.

The chest protector embodying the present invention is shown as operatively associated and mounted on a steering post 10 on one end of which is rotatively arranged a steering wheel having a circular rim 11, a hub 12 and a pair of spokes 13—13 diametrically arranged on opposite sides of the hub and connecting the same with the rim. The shape of the steering wheel illustrated is intended merely as representative of a typical steering wheel of a modern automotive vehicle and as such, may be molded with the hub, spokes and rim as an integral structure of a suitable plastic material, with or without an internal core or reinforcement.

The hub 12 is shown as provided with a cylindrical recess 14 which, in the conventional steering wheel assembly, houses the contacts for the horn and is closed by a suitable cap (not shown).

The chest protector embodying the present invention is shown as comprising a shell indicated generally at 15 and a pad 16 of compressible material. The shell 15 is shown as including a front wall or panel 17 which is preferably of generally semi-circular outline as shown and has a continuous downturned flange 18 extending from the margin of the front wall or panel 17. The pad 16 is shown as a cylindrical block or column having its inner end engaging the end face of the recess 14 in the hub of the steering wheel and having its outer end engaging the rear face of the front wall or panel 17 and is suitably connected thereto. The preferred manner of connection between the front wall or panel 17 and the pad 16 is by cementing the engaging surfaces of these members. The radius of the semi-circular portion of the continuous flange 18 is considerably less than the radius of the rim 11 of the steering wheel so as to leave a semi-circular space between the protector and the steering wheel rim through which the driver can extend his fingers and hands for grasping the rim and steering the vehicle.

It will be noted that the front wall or panel 17 of the shell 15 bulges outwardly or toward the driver with the crest of such bulge being over the pad 16. Such bulging causes the front wall or panel 17 to be outwardly convexly curved in horizontal section as shown in Fig. 3 and also outwardly convexly curved in vertical section as shown in Fig. 4. Referring to Figs. 3 and 4, it will be seen that the salient central portion of the shell projects outwardly beyond the plane of the rim of the steering wheel a slight amount.

While the pad 16 is interposed between the shell 15 and the end of the steering post 10 with the base or inner end of the pad 16 in effect resting on the post and serving as a solid support therefor, the shell 15 itself is mounted on the steering wheel in accordance with the present invention. As shown, the turndowned flange 18 at those places, two in number and diametrically opposite each other, where the spokes 13—13 cross the flange, is cut out as indicated at 19 to accommodate the respective spoke 13. Such cutout 19 is shown as generally a semicircular recess which conforms to the shape of the spoke at the location where the flange is arranged and the edge of such cutout engages the spoke. While any suitable means may be employed for holding the shell 15 against the spokes, the means shown are preferred and comprise a strap 20 of U-shaped form with laterally extending flanges 21, 21 at opposite free ends which bear against the undersurface or inner face of the front wall or panel 17. The flanges 21, 21 are held to the front wall or panel 17 by suitable fastening means such as screws 22, 22, the heads of which are preferably countersunk so that the outer ends of the screw heads are flush with the front or outer face of the front wall or panel 17. As best shown in Fig. 5, the U-shaped straps 20 pass around the spokes 13 on the side opposite from the shell 15. Referring to Fig. 3, it will be noted that each strap 20 as well as its lateral flanges 21 are contoured so as to conform to the longitudinal inclination of the respective spoke in the case of the U-shaped portion of the strap and the inclination of the undersurface or bottom face of the front wall or panel 17 in the case of the lateral flanges 21. In this manner, the shell 15 is clamped firmly to the sterring wheel with the bulging central portion being supported or backed up by the compressible pad 16.

It is an important feature of the present invention that the shell 15 be of a sufficiently rigid construction to prevent undesirable deformation of the same. The design shown and described admirably satisfies this requirement and it will be noted that the continuous turndowned flange acts as a marginal stiffening rim which serves to reinforce the shell. At the same time, such design permits the front wall or panel to have a degree of flexure in the direction of the axis of the steering post 10, for a purpose hereinafter described. Such a construction or shell 15 can be formed of any suitable material such as sheet metal or fiber reinforced plastic material, for example, phenolic bound Fiberglas.

The pad 16 should be constructed of a material which is essentially energy absorbing under compression, as compared with a material which is essentially energy storing. An ideal energy absorbing material would be one which has no recovery, that is, when the impact forces act upon the pad, a certain deflection or compression of the pad is effected and there is no expansion of this pad when the load is removed. However, with such a material, it will be seen that the protector can be used effectively only once since the pad 16 will have to be replaced with a new uncrushed pad. This would not be too undesirable since the force necessary to crush the pad would be of such magnitude that there would probably be other damage to the vehicle that would require it to be placed in a garage for repairs anyway. However, it is consistent with the present invention to provide a padding material which has a slow recovery after being compressed so that such material still operates essentially to absorb energy and not merely to store energy which would cause excessive rebound and increase the likelihood of secondary hits.

It is preferred to employ a padding material which will have a complete but slow recovery. The padding material should have as low a spring rate as possible, consistent with the maximum thickness of material that can be utilized in a particular installation and the impact energy anticipated. Bottoming of the padding material making up the pad 16 under load cannot be tolerated since this would destroy the complete effectiveness of the protector.

An example of a padding material having a complete but slow recovery characteristic is a lightweight closed cell cellular material expanded with a chemical blowing agent, which material is comprised of 10 to 60% of a resinous polymer typically being polyvinyl chloride, 16 to 80% of a rubbery copolymer typically being butadiene-1,3 acrylonitrile and 20 to 60% of a plasticizer typically being di 2 ethyl hexyl phthalate. The nature of such a material and its method of manufacture is described fully in United States Patent No. 2,570,182 dated October 9, 1951.

Examples of crushable materials which have no recovery and are usable in the present invention but are not preferred solely because they permit only a single deflection of the pad 16, are such materials as polystyrene foam, cellulose acetate foam, polyvinyl chloride foam, all of which materials are cellular and permanently crushable.

Such materials as foam rubber and different types of felt matting materials such as hair felt, jute felt and a combination of wool and rayon felt have been demonstrated to be decidedly inferior to the essentially energy absorbent materials previously mentioned used in the practice of the present invention.

Figure 7:
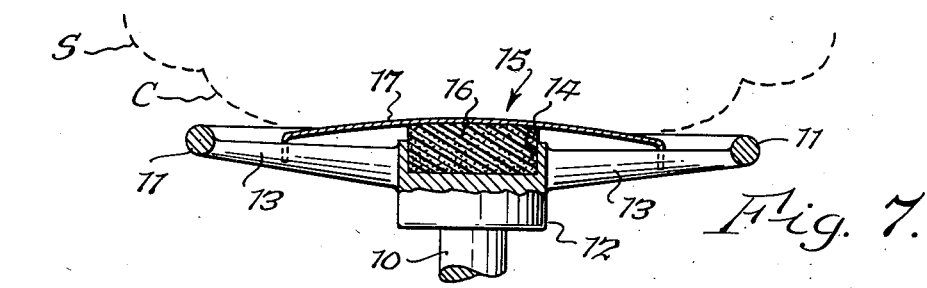
Fig. 7 is a view similar to Fig. 6 but illustrating the manner in which the chest of the driver engages the protector under partial load.
Figure 8:
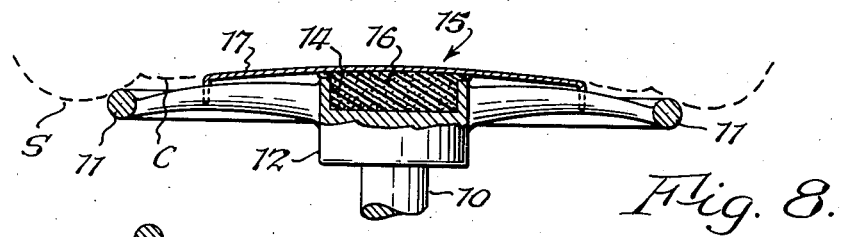
Fig. 8 is a view similar to Fig. 7 but representing the condition of the body, protector and steering wheel under full impact load.

It is an important feature of the present invention that when the chest of the driver is thrown against the shell 15, the area of engagement between the shell 15 and the chest is substantial so that the unit load or pressure is relatively low. Fig. 6 depicts the first contact between the chest of the driver which is indicated at C with the salient part of the front wall or panel 17 which is immediately over the compressible pad 16. The shoulders S are represented at opposite sides of the chest C. As the impact load is applied, the chest, shoulders and mechanical parts will assume the conditions depicted in Fig. 7. It will be noted that in the first place, the bulging front wall or panel 17 has partially flattened so as to provide a relatively large area of contact with the body substantially coextensive with the area of the front wall or panel 17. This distributes the load over a correspondingly large area of the chest and reduces the likelihood of injury. It will be noted further that the flattening of the front wall or panel 17 has been resisted by the pad 16 which is partially compressed as a result thereof. It will also be noted how the shoulders S have moved by inertia toward the rim 11 of the steering wheel. Under the full impact load depicted in Fig. 8, it will be observed that there has been a further compression of the energy absorbing pad 16, as well as some of the load being transmitted to the spokes 13 through the connection of the shell 15 therewith. This results in a bending of the spokes which is further accentuated by the shoulders S being forcibly thrown into contact with the rim of the wheel. In general, it will also be noted that the chest and shoulders change from a convex to a concave disposition when the body trunk is thrown violently against the protector and steering wheel.

Figure 9:
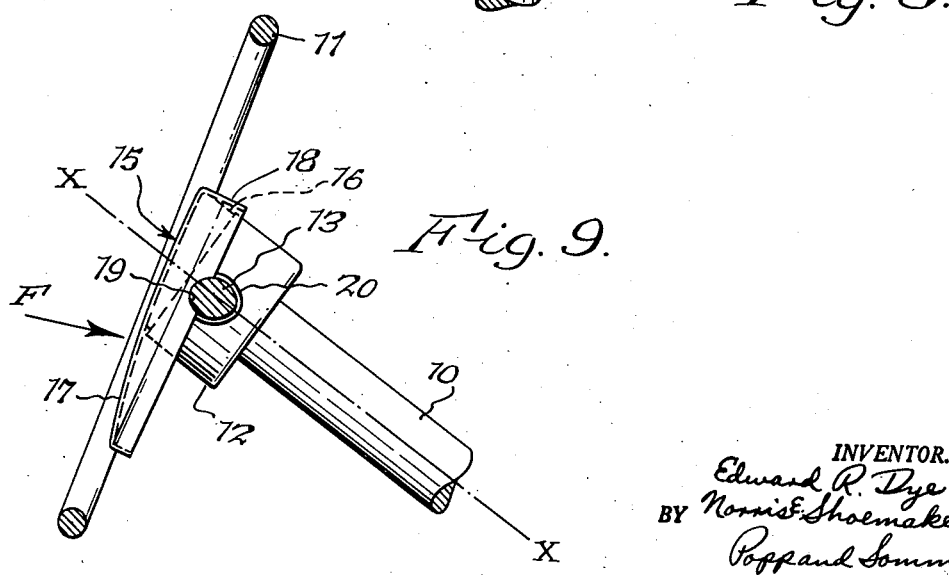
Fig. 9 is an elevational view of the side of the chest protector and steering post with portions of the steering wheel broken away and illustrating the angular deflection of the chest protector relative to the steering post when the principal load, by engagement of the chest of the driver with the protector, is applied in the direction of the arrow F.

It will also be noted that the structural shape of the shell 15 together with its mounting on the pad 16 is such that a flat surface is presented even when the chest of the driver contacts the shell at an angle with the line or axis of the steering post. This is depicted in Fig. 9 wherein x—x represents the axis of the steering post and arrow F represents the direction of impact of the chest against the shell 15. It will be noted that the shell tips down to present the outer or front face of its wall or panel 17 to the driver's chest, the steering wheel being sufficiently flexible to permit of this.

From the foregoing, it will be seen that the present invention provides a chest protector which includes a lightweight structural shell having a stiffened rim construction supported generally centrally on an elastic shock absorbing pad and marginally on the spokes of the steering wheel and which by reason of the shape of the shell presents a nearly flat surface to the chest of the driver during the deformation to failure of the spokes of the steering wheel and which by reason of the lightweight construction of the protector is easily accelerated to reduce the initial impulse force. By actual experimentation, it has been evaluated that the installation of a chest protector constructed in accordance with the present invention will reduce the injury potential of the steering wheel and steering post by a factor of approximately 4.

We claim:

1. In combination, a steering post, a steering wheel on one end of said post, and having spokes and a rim, and a chest crash protector comprising a cup-shaped shell having a front wall arranged on the driver's side of said spokes within the confines of said rim and generally in the plane thereof and also having a continuous flange projecting from the margin of said wall toward said spokes, said flange being recessed where said spokes cross the same, strap means securing said shell to said spokes and a column of compressible essentially energy absorbing material abuttingly disposed between said shell and said one end of said post, whereby said column and spokes jointly support said shell.

2. In combination, a steering post, a steering wheel having a rim, spokes and a hub, the latter being mounted on one end of said post, said hub having a recess in its outer face, and a chest crash protector comprising a cup-shaped shell having a front wall arranged over said spokes within the confines of said rim and generally in the plane thereof and arranged principally in the lower half of the wheel and also having a continuous downturned flange, a column of compressible essentially energy absorbing material abuttingly disposed between said shell and said one end of said post and having its outer end cemented to said wall and its inner end seated in said recess, and means for mounting said shell on said spokes adjacent said flange, whereby said column and spokes jointly support said shell.

3. In combination, a steering post, a steering wheel on one end of said post, and having spokes and a rim, and a chest crash protector comprising a cup-shaped shell having a front wall arranged over said spokes within the confines of the rim of the wheel and generally in the plane thereof and also having a continuous flange projecting from the margin of said front wall toward said spokes, said front wall being outwardly convexly curved on the driver's side, means fastening said shell on said spokes adjacent said flange, and a column of compressible essentially energy absorbing material abuttingly disposed between the salient portion of said front wall and said one end of said post, whereby said column and spokes jointly support said shell.

4. In combination, a steering post, a steering wheel on one end of said post, and having spokes and a rim, and a chest crash protector comprising a cup-shaped shell having a front wall arranged over said spokes and generally in the plane of the rim of the wheel and being generally semi-circular in outline and having its margin spaced from the rim of the wheel and being arranged principally in the lower half of the wheel and also having a continuous flange projecting from said margin toward said spokes, said front wall being outwardly convexly curved on the driver's side with the salient portion thereof arranged over said one end of said post, means fastening said shell on said spokes adjacent said flange, and a column of compressible essentially energy absorbing material interposed between and abutting said salient portion at one end and said one end of said post at the other end, whereby said column and spokes jointly support said shell.

References Cited in the file of this patent

UNITED STATES PATENTS

| | | |
|---|---|---|
| 1,647,903 | Cook | Nov. 1, 1927 |
| 2,563,339 | Kellogg | Aug. 7, 1951 |
| 2,626,163 | Scantlebury | Jan. 20, 1953 |

FOREIGN PATENTS

| | | |
|---|---|---|
| 751,438 | France | Jan. 19, 1933 |
| 769,903 | France | June 18, 1934 |